US007466818B2

United States Patent
Zaluaga

(10) Patent No.: US 7,466,818 B2
(45) Date of Patent: Dec. 16, 2008

(54) ACOUSTIC SHOCK PREVENTION

(75) Inventor: Walter A. Zaluaga, Rochester Hills, MI (US)

(73) Assignee: Clarity Technologies, Inc., Auburn Hills, MI (US)

( * ) Notice: Subject to any disclaimer, the term of this patent is extended or adjusted under 35 U.S.C. 154(b) by 0 days.

(21) Appl. No.: 11/856,494

(22) Filed: Sep. 17, 2007

(65) Prior Publication Data

US 2008/0025494 A1   Jan. 31, 2008

Related U.S. Application Data

(63) Continuation of application No. 10/660,336, filed on Sep. 11, 2003, now Pat. No. 7,272,233.

(51) Int. Cl.
*H04M 9/00* (2006.01)

(52) U.S. Cl. .................................... 379/392.01; 381/55

(58) Field of Classification Search ................... 381/55, 381/101–102, 98; 379/93.09, 386, 390.01–390.04, 379/406.01–406.06, 392.01; 370/289
See application file for complete search history.

(56) References Cited

U.S. PATENT DOCUMENTS

| 5,550,924 | A | 8/1996 | Helf et al. |
| 6,665,381 | B1 * | 12/2003 | Nassimi .................... 379/93.11 |
| 6,738,358 | B2 * | 5/2004 | Bist et al. .................... 370/289 |
| 6,785,382 | B2 | 8/2004 | McLaughlin et al. |
| 6,834,108 | B1 | 12/2004 | Schmidt |
| 7,272,233 | B2 * | 9/2007 | Zaluaga ........................ 381/55 |
| 2005/0018862 | A1 * | 1/2005 | Fisher ........................ 381/98 |
| 2005/0031061 | A1 | 2/2005 | Ojard et al. |

OTHER PUBLICATIONS

"Soundshield," http:q//www.polaris.com.au/soundshield/html.
"Soundshield," http://www.teleman.com.au/au/headset-soundshield.asp.

* cited by examiner

*Primary Examiner*—Fan Tsang
*Assistant Examiner*—Lun-See Lao
(74) *Attorney, Agent, or Firm*—Brooks Kushman P.C.

(57) ABSTRACT

Acoustic shock is reduced by attenuating an input signal based on tones detected through frequency domain analysis. The spectrum of the input signal is obtained. A relative energy signal includes a plurality of relative energy elements, each representing the relative energy in a corresponding frequency bin of the input signal spectrum. A difference signal includes a plurality of difference elements, each representing a difference between a corresponding frequency bin value and an adjacent frequency bin value. A plurality of detection signals are determined, each detecting the presence of a sound element in the input signal based on at least one of the relative energy signal and the difference signal. The detection signals are combined to produce an attenuation signal for attenuating the input signal.

1 Claim, 4 Drawing Sheets

ACOUSTIC SHOCK PREVENTION

CROSS-REFERENCE TO RELATED APPLICATIONS

This application is a continuation of U.S. application Ser. No. 10/660,336, filed Sep. 11, 2003, issued as U.S. Pat. No. 7,272,233 on Sep. 18, 2007, which is hereby incorporated by reference in its entirety.

BACKGROUND OF THE INVENTION

1. Field of the Invention

The present invention relates to preventing acoustic shock in voice communication systems.

2. Background Art

Exposure to noise can cause various health problems including permanent hearing loss, temporary hearing loss, tinnitus, headaches, depression, increased sensitivity to loud noises, and the like. The risk of injury and the extent of any resulting injury are functions of the intensity of noise levels, the length of exposure, the type of noise, and the sensitivity level of the person exposed. Acoustic shock can occur due to a sudden or unexpected noise or due to prolonged exposure to noise. Various types of workers are susceptible to injury from acoustic shock, including telephone operators, telemarketers, technical support personnel, and the like, who spend a great many hours using a telephone. Other activities that expose a person to prolonged sound sources may also be susceptible.

A telephone near-end user can experience unpleasant sounds resulting in acoustic shock when an outgoing call inadvertently connects with a fax machine, modem, or similar device. Acoustic shock can also occur when a far-end user hits a telephone button, generating a DTMF signal. Other sources of acoustic shock can include noise coupled into a telecommunication system from natural or man-made sources, failure of telecommunications equipment, and the like.

Different standards exist for limiting acoustic pressure in headsets and handsets. The North American A-weighted curves are based on a 90 dBA eight hour time weighted average free field noise exposure limit. In other words, a user cannot be subjected to more than 90 dBA noise level during an eight hour period. The CERN standard permits an 85 dBA exposure limit over eight hours. Both standards are measured at the ear reference point (ERP). Both standards permit higher noise levels for shorter periods of time. In calculating exposure, acoustic pressure values may be corrected according to several factors including non-occupational exposure, whether the noise was received from a headset or a handset, signal bandwidth, and the like.

What is needed is to prevent acoustic shock, as much as possible, without excessively inhibiting desirable signal components such as speech, dial tones, ring tones, and the like. Acoustic shock should be prevented without the use of a computationally intensive algorithm, permitting inexpensive implementation within handsets, headsets, and other telecommunications equipment.

SUMMARY OF THE INVENTION

The present invention provides a shriek rejecter which attenuates an input signal based on tones detected through frequency domain analysis.

A system for preventing acoustic shock is provided. The system includes an attenuator for attenuating an input signal by a variable amount. A frequency analyzer converts a time windowed portion of the input signal into frequency bins. An energy calculator determines a relative energy signal having an element corresponding to each frequency bin. Each element of the relative energy signal is based on energy magnitude in the corresponding frequency bin relative to a total energy of the time windowed portion of the input signal. Each of a plurality of signal detectors generates a detection signal for modifying the variable attenuation amount based on the relative energy signal. At least one of the detection signals includes a vector of attenuation elements, each attenuation element corresponding to one of the frequency bins. Attenuation logic determines an attenuation value signal controlling the variable attenuation amount based on the detection signals.

In an embodiment of the present invention, at least one of the signal detection signals, when asserted, inhibits attenuation by the variable attenuator.

In another embodiment of the present invention, a difference calculator calculates a difference signal based on a difference in energy between each pair of adjacent frequency bins. A general tone detector generates a general tone detection signal based on the relative energy signal and on the difference signal. The general tone detection signal may include a vector of attenuation elements with each attenuation element asserted if that particular element has a corresponding difference signal element exceeding a difference threshold and a corresponding relative energy signal element less than a relative energy threshold.

In still another embodiment of the present invention, a fax/modem detector generates a fax/modem detection signal based on any element in a subset of the relative energy signal exceeding a preset threshold.

In yet another embodiment of the present invention, a select tone detector generates a select tone detection signal based on at least one element of the relative energy signal exceeding a preset threshold. The select tone detector examines relative energy signal elements corresponding to known select tone frequencies such as dial tones and ring tones.

In a further embodiment of the present invention, the attenuation logic scales each attenuation element of at least one detection signal having a vector of attenuation elements.

In a still further embodiment of the present invention, the attenuation logic implements a spreading filter across the attenuation elements of at least one of the detection symbols having a vector of attenuation elements.

A method of reducing acoustic shock is also provided. The spectrum of an input signal is obtained. A relative energy signal is determined as a plurality of relative energy elements. Each relative energy element represents the relative energy in a corresponding frequency bin of the input signal spectrum. A difference signal is determined as a plurality of different elements. Each difference element represents a difference between a corresponding frequency bin value and an adjacent frequency bin value. A plurality of detection signals are determined. Each detection signal detects the presence of a sound element in the input signal based on at least one of the relative energy signal and the difference signal. The detection signals are combined to produce an attenuation signal having an attenuation element corresponding to each frequency bin of the input signal. The input signal is attenuated using the attenuation signal.

A method of reducing acoustic shock is provided. The spectrum of an input signal is obtained. A relative energy signal is determined as a function of frequency based on the spectrum. A difference signal is determined based on a change in magnitude in the spectrum as a function of frequency. A general tone signal is determined as a function of the relative energy signal and the difference signal. A fax/ modem signal is determined as a function of the relative energy signal. A select tone signal is determined as a function of the relative energy signal. An attenuation signal is determined as a function of frequency based on the general tone signal, the fax/modem signal and the select tone signal. A sound signal is attenuated based on the attenuation signal.

A method of preventing acoustic shock is provided. A sound signal is attenuated if at least one of a general tone and a fax/modem tone is detected, but only if at least one select tone is not detected.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
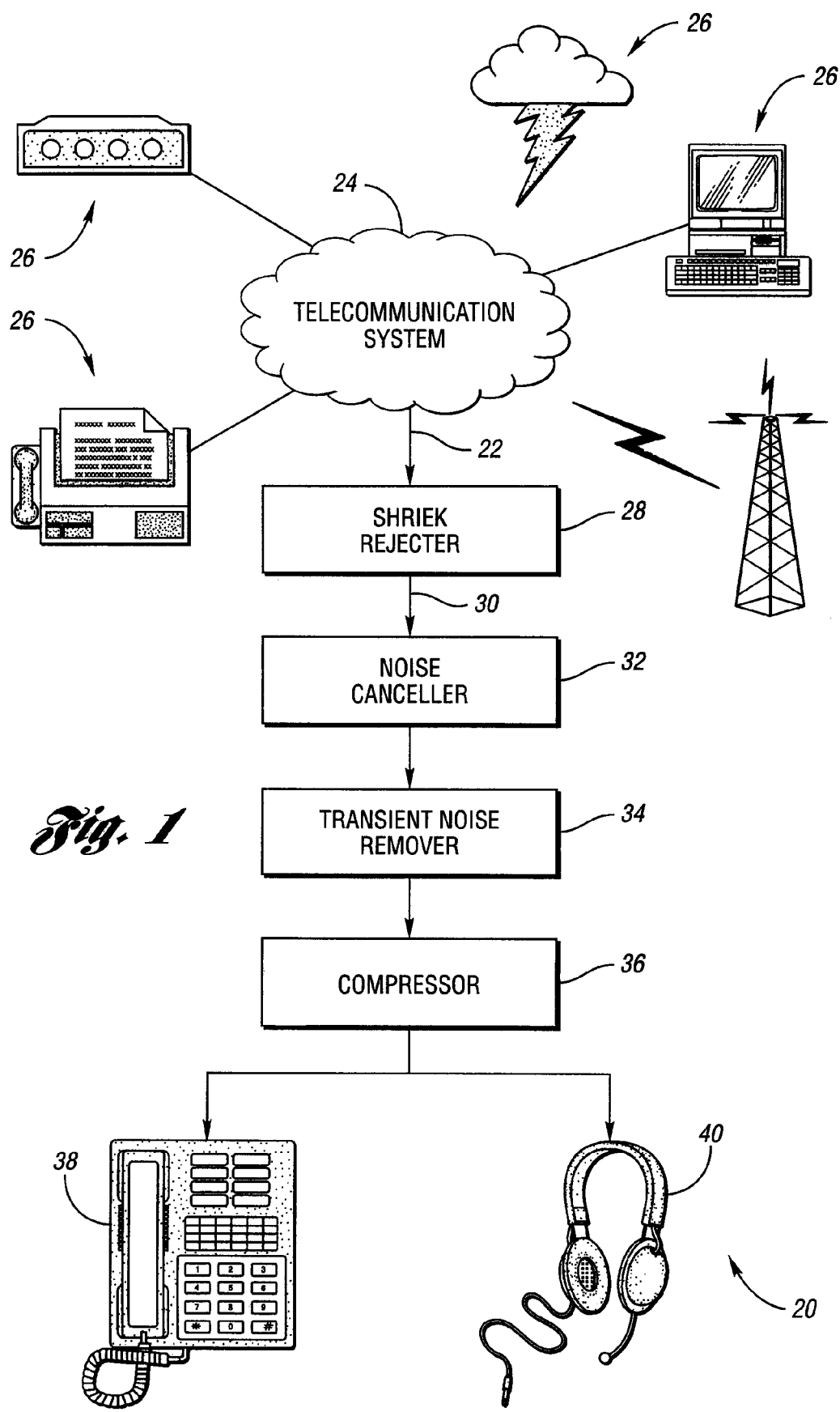
FIG. 1 is a block diagram illustrating an acoustic shock prevention system according to an embodiment of the present invention.

Referring to FIG. 1, a block diagram illustrating an acoustic shock prevention system according to an embodiment of the present invention is shown. An acoustic shock prevention system, shown generally by 20, receives input signal 22 from telecommunication system 24. Telecommunication system 24 may be subject to a wide variety of noise sources 26 such as fax machines, modems, dual tone multi-frequency (DTMF) signals, special information tone (SIT) signals, cross-coupling from man-made and natural sources, and the like. Noise from one or more of sources 26 appearing on input signal 22 can create injury or discomfort to a user listening to signal 22.

Acoustic shock prevention system 20 reduces the effects of noise sources 26 in input signal 22 without substantially affecting desirable components of signal 22 including speech, dial tones, ring tones, and the like. Acoustic shock prevention system 20 includes shriek rejecter 28 which generates output signal 30 having substantially reduced components generated by noise sources 26. Shriek rejecter 28 detects high energy concentrations in small bandwidths of unwanted components in signal 22 and sets a variable attenuator to remove these components. The operation of shriek rejecter 28 is described in detail below.

Acoustic shock prevention system 20 may also include additional components improving the quality of output signal 30. Noise canceller 32 follows shriek rejecter 28 to improve the signal-to-noise ratio of output signal 30. Noise canceller 32 may be implemented using either frequency domain or time domain noise cancellation routines. One suitable routine is disclosed in U.S. Patent application Ser. No. 10/272,921, titled "Noise Reduction In Subbanded Speech Signals," filed Oct. 17, 2002, which is incorporated by reference herein in its entirety.

Acoustic shock prevention system 20 may also include transient noise remover 34 for reducing transients and short duration disturbances in signal 30. Very short duration transients may arise from noise sources 26 or may appear as artifacts in signal 30 after removing unwanted components from input signal 22. Algorithms for removing brief transients are well known in the art of signal processing.

Acoustic shock protection system 20 may also include compressor 36 limiting the amplitude of output signal 30. Compressor 36 may provide soft or hard limiting of signal magnitude to prevent excessively loud portions of desired components in input signal 22 from creating acoustic shock. The output of acoustic shock prevention system 20 may be supplied to handset 38 or headset 40.

Figure 2:
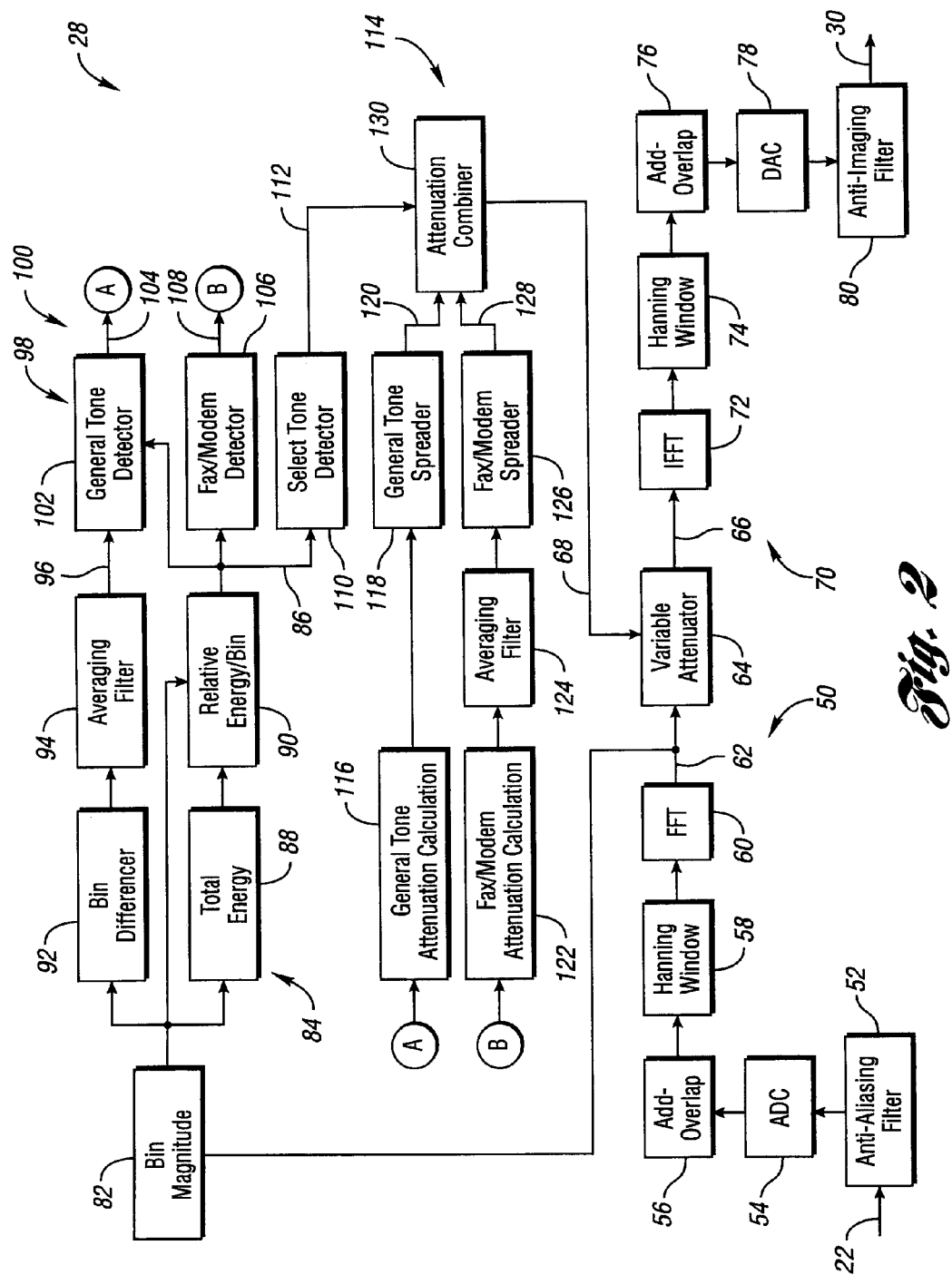
FIG. 2 is a block diagram illustrating a shriek rejecter according to an embodiment of the present invention.

Referring now to FIG. 2, a block diagram illustrating a shriek rejecter according to an embodiment of the present invention is shown. As will be appreciated by one of ordinary skill in the art, the operations illustrated in the block diagrams are not necessarily sequential operations. Similarly, operations may be controlled by software, hardware, or a combination of both. Various elements of FIG. 2 may be implemented within a microprocessor, digital signal processor, custom integrated circuit, discrete electronic components, and the like. The present invention transcends any particular implementation and the embodiment is shown in block diagram form for ease of illustration.

Shriek rejecter 28 includes a frequency analyzer, shown generally by 50, which determines a spectrum for each of a sequence of time windowed portions of input signal 22. In the example shown, input signal 22 is assumed to be an analog signal. However, as will be recognized by one of ordinary skill in the art, the present invention applies whether input signal 22 is received in analog form, discrete time form, digitized form, or as spectral components.

Anti-aliasing filter 52 removes high frequency components from input signal 22. Anti-aliasing filter 52 may be, for example, a ninth order low-pass filter with a cut-off frequency of 4 kHz. Analog-to-digital converter (ADC) 54 digitizes the output of anti-aliasing filter 52. In this example, a sampling rate of 8 kHz is appropriate. Add-overlap buffer 56 buffers the digitized input signal 22 for time-windowing and provides overlap for Hanning window 58. Various overlaps are possible with values of 25% and 50% typical. Hanning window 58 scales the amplitude of windowed input signal 22. Fast Fourier transform (FFT) 60 calculates a spectrum for each time windowed input signal 22. An advantage of the present invention is the ability to reduce unwanted components in input signal 22 using a relatively low resolution frequency transform. For example, thirty-two bins spanning 0 to 4 kHz are sufficient for most speech applications.

Variable attenuator 64 attenuates spectrum signal 62 to produce attenuated spectrum signal 66 based on attenuation value signal 68. Preferably, attenuation value signal 68 is a vector having an attenuation element corresponding to each frequency bin in spectrum signal 62. Variable attenuator 64 scales each element of spectrum signal 62 with a corresponding value from attenuation value signal 68. Alternatively, attenuation value signal 68 may include a vector having a number of elements different than the number of frequency bins in spectrum signal 62. In the simplest case, attenuation value signal 68 is a scalar value for modifying each bin value in spectrum signal 62 or for modifying a time-domain signal.

Shriek rejecter 28 may include frequency-to-time converter 70 for converting attenuated spectrum signal 66 into output signal 30. In the example shown, inverse fast Fourier transform (IFFT) 72 converts attenuated spectrum signal 66 into a digital time domain representation. Hanning window 74 and add-overlap buffer 76 reverse the effects of Hanning window 58 and add-overlap buffer 56, respectively. Digitalto-analog converter (DAC) 78 produces a continuous time signal which is filtered by anti-imaging filter 80 to remove high frequency artifacts produced in the analog conversion. The resulting continuous time analog signal 30 represents input signal 22 with unwanted components removed. As will be recognized by one of ordinary skill in the art, some or all of frequency-to-time converter 70 may be omitted depending upon downstream processing of output signal 30. For example, if noise canceller 32 operates in the frequency domain, shriek rejecter 28 need not contain converter 70.

Shriek rejecter 28 calculates attenuation value signal 68 based on the magnitude components of spectrum signal 62, as indicated by bin magnitude 82. An energy calculator, shown generally by 84, generates relative energy signal 86 indicating the relative energy in each frequency bin. The total energy is calculated by summing all bin values, as indicated by total energy 88. The relative energy per bin is calculated by dividing each bin value by the total energy, as indicated by relative energy/bin 90. Relative energy signal 86 is useful in shriek reduction because speech tends to have wide energy dispersion over frequency whereas tonal noise does not.

Shriek rejecter 28 may also include bin differencer 92 for determining the difference between each pair of adjacent bins in the magnitude spectrum. For example, each difference signal bin D(n) can be determined by the following equation:

$$D(n)=F(n)-F(n+1)$$

where F(n) is the $n^{th}$ frequency bin, N is the number of frequency bins, and n ranges from zero to N−1. The last value, D(N−1), may be set to D(N−2), F(N−1), zero, or any other suitable value. Each bin may be time averaged in averaging filter 94 to produce difference signal 96. Averaging filter 94 may be implemented, for example, by a first-order digital filter.

Shriek rejecter 28 includes a plurality of signal detectors, shown generally by 98, each of which generates a detection signal, shown generally by 100. General tone detector 102 generates general tone detection signal 104 based on relative energy signal 86 and difference signal 96. General tone detection signal 104 may be a vector having an element corresponding with each frequency bin. The element is asserted if a tone is detected within the corresponding bin. To avoid asserting elements in general tone detection signal 104 during periods of speech, elements of general tone detection signal 104 are not asserted if spectral energy is widely distributed as is common in speech. Algorithmically, each element of general tone detection signal 104 is asserted only if the corresponding difference signal element exceeds a difference threshold and a corresponding relative energy signal element exceeds a relative energy threshold.

Fax/modem detector 106 generates fax/modem detection signal 108 based on a subset of relative energy signal 86. Fax/modem detector 106 examines a limited spectral range known to contain frequencies used by fax machines, modems, and other digital transmission equipment. If the energy in any frequency bin contained within this spectral range exceeds a preset threshold, the corresponding element of fax/modem detection signal is asserted. The spectral range over which examination occurs may be preset or may be set for different applications and/or regions.

Select tone detector 110 generates select tone detection signal 112 indicating the presence of one or more desirable tonal components in input signal 22. Desirable components include one or more dial tones, ring tones, and the like. Select tones include any tonal signal that must be passed through in output signal 30. Select tone detector 110 examines specific bins in relative energy signal 86 for values above a preset threshold. For any select bin in which the threshold is exceeded, the corresponding component in select tone detection signal vector 112 is asserted. Alternatively, select tone detection signal 112 may be a scalar value asserted if any select bin energy value exceeds a preset threshold.

Shriek rejecter 28 includes attenuation logic, shown generally by 114, generating attenuation value signal 68 based on detection signals 100. Preferably, attenuation value signal 68 has an element controlling the attenuation of each frequency bin in spectrum signal 62, with an element value of "1" causing complete attenuation and an element value of "0" causing no attenuation. Attenuation logic 114 may include attenuation calculators for setting attenuation element values between zero and one.

Attenuation logic 114 may include spreading filters for smoothing attenuation signals in frequency. For example, an attenuation vector may indicate the presence of a tone with a "1" as follows: [ . . . , 0, 0, 0, 1, 0, 0, 0, . . . ] Smoothing this vector spreads attenuation values into adjacent bins resulting in, for example, the following vector: [ . . . , 0, 0.2, 0.5, 0.8, 0.5, 0.2, 0, . . . ]. Spectral attenuation spreading reduces abrupt transitions as a function of frequency, reducing unnatural effects in output signal 30. Various smoothing filters are known, such as Hanning windows, Hamming windows, and the like.

In the exemplary system shown in FIG. 2, general tone attenuation calculation 116 receives general tone detection signal 104. The output of general tone attenuation calculation 116 is passed through general tone spreader 118 to produce general tone coefficients 120. Fax/modem attenuation calculation 122 scales fax/modem detection signal 108. Averaging filter 124 averages scaled coefficients over time. Fax/modem spreader 126 frequency averages the time averaged coefficients to produce fax/modem coefficients 128.

Attenuation combiner 130 combines coefficients from various signal detectors 98 to generate attenuation value signal 68. In the example shown, fax/modem coefficients 128 and general tone coefficients 120 are multiplied, element-by-element. This product vector is passed as attenuation value signal 68 if select tone detection signal 112 does not indicate the presence of desired tones in input signal 22. Select tone detection signal 112 may be used to deactivate attenuation on a per-bin basis if select tone detection signal 112 is a vector. Alternatively, select tone detection signal 112 may inhibit all attenuation if a scalar value is produced.

Figure 3:
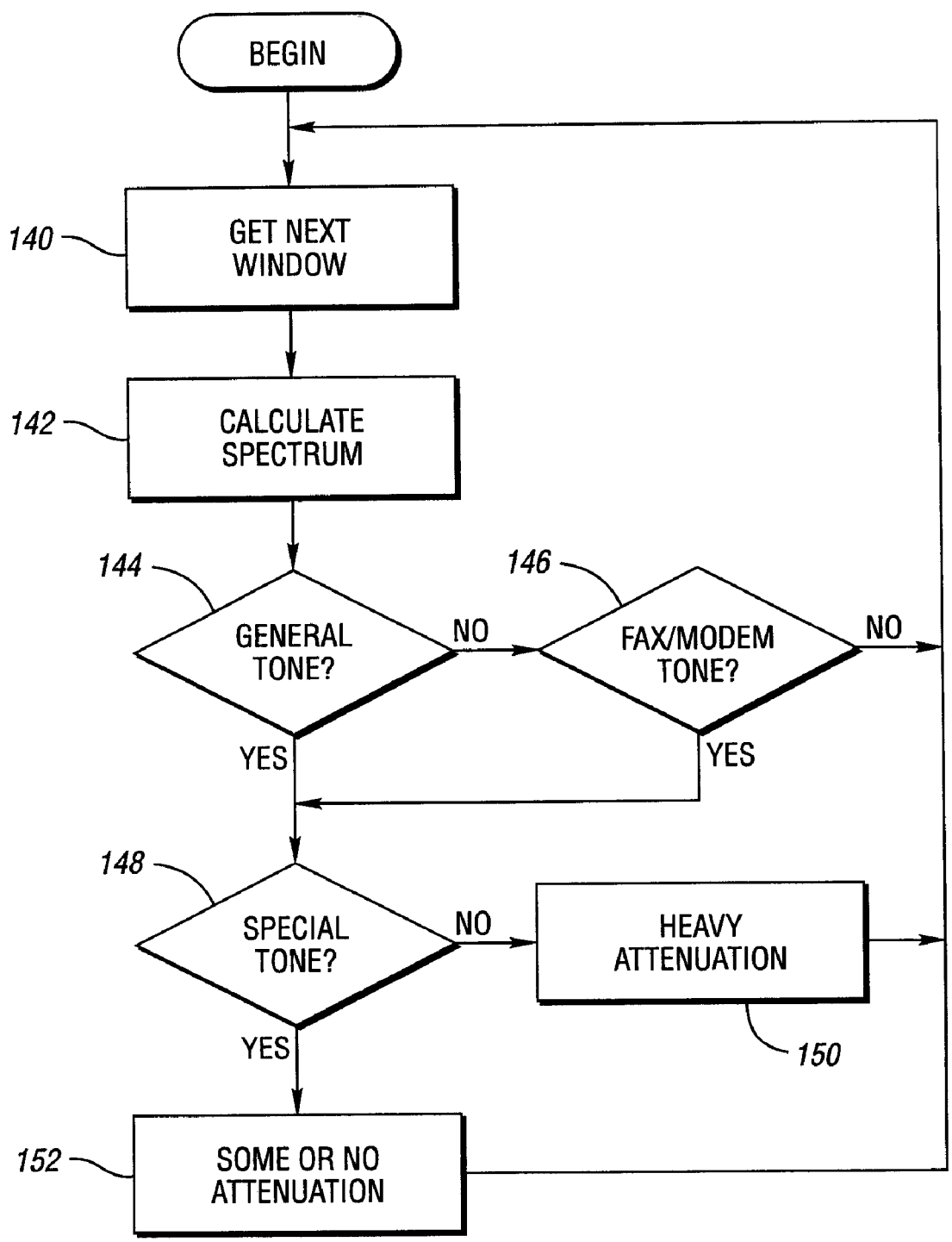
FIG. 3 is a flow diagram illustrating acoustic chock prevention according to an embodiment of the present invention.

Referring now to FIG. 3, a flow diagram illustrating acoustic shock prevention according to an embodiment of the present invention is shown. As will be appreciated by one of ordinary skill in the art, the operations illustrated in the flow diagrams are not necessarily sequential operations. Similarly, operations may be controlled by software, hardware, or a combination of both. The present invention transcends any particular implementation and the embodiment is shown in a sequential flow chart form for ease of illustration.

A time-windowed value of an input signal is obtained, as in block 140. A spectrum of the time-windowed value is calculated, as in block 142. A check is made to determine if any general tones are present, as in block 144. A check is also made to determine if any fax/modem tone is present, as in block 146. In a preferred embodiment, each check is made regardless of the outcome of the other check. If neither general tones nor fax/modem tones are present, no attenuation is provided. The process is repeated by obtaining the next time window.

If any general tone or a fax/modem tone is detected, a check is made to determine if a special tone is present, as in block

148. If no special tone is present, the input signal is heavily attenuated to remove general tones and/or fax/modem tones, as in block 150. If a special tone is detected, either light or no attenuation is provided, as in block 152. Thus, the presence of special tones overrides attenuation that would otherwise be based on the detection of general tones and/or fax/modem tones.

Figure 4A:
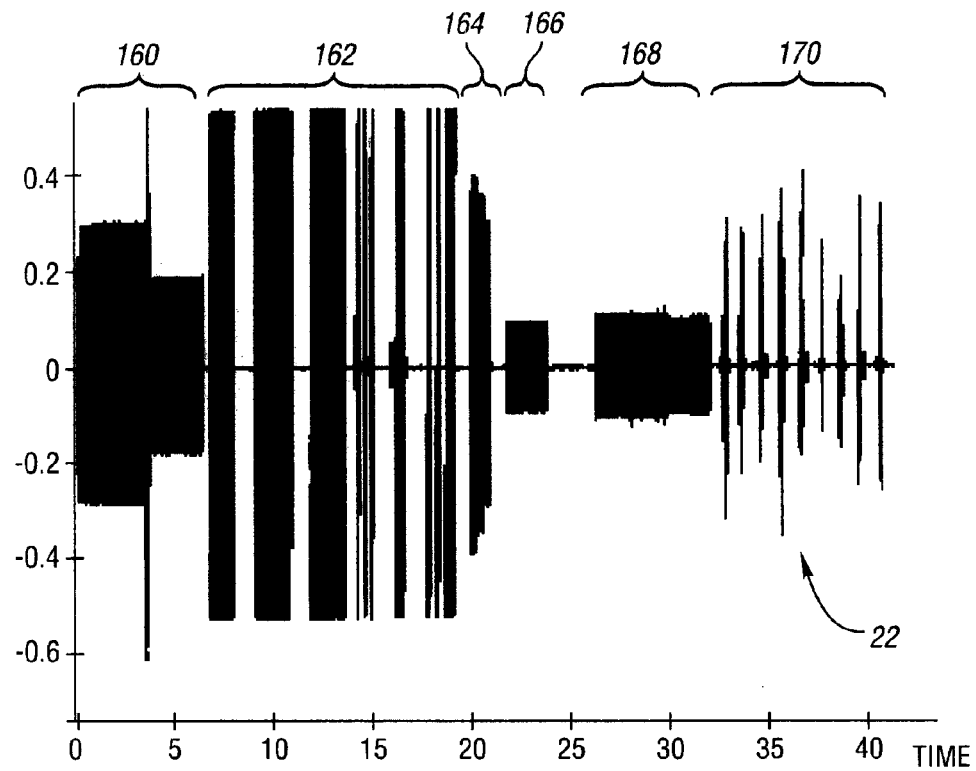
FIGS. 4a and 4b are input and output signals, respectively, illustrating acoustic shock prevention according to an embodiment of the present invention.
Figure 4B:
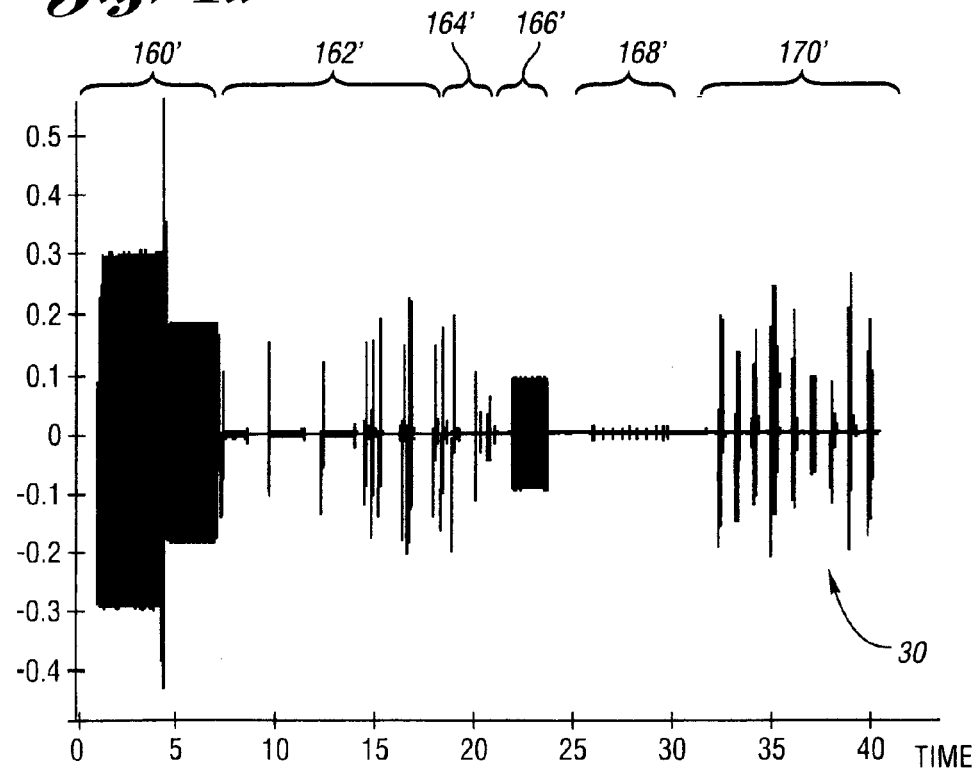

Referring now to FIGS. 4a and 4b, input and output signals, respectively, illustrating acoustic shock prevention of an embodiment of the present invention are shown. Sample input signal 22 includes region 160 containing a dial tone, region 162 containing DTMF signals, region 164 containing SIT signals, region 166 including a ring tone, region 168 including a fax signal, and region 170 including a speech signal. Corresponding exemplary output signal 30 substantially passes the dial tone signal, indicated by region 160', the ring tone signal, indicated by region 166', and the speech signal, indicated by region 170'. Output signal 30 shows as substantially eliminated DTMF signals, in region 162', SIT signals, in region 164', and fax signals, in region 168'.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of preventing acoustic shock comprising:
  detecting for the presence of at least one general tone;
  detecting for the presence of at least one fax/modem tone;
  detecting for the presence of a select tone, the select tone being at least one signal from a set including at least one dial tone and at least one ring tone; and
  attenuating a sound signal if at least one of the at least one general tone is detected and the at least one fax/modem tone is detected but only if the at least one select tone is not detected.

\* \* \* \* \*